US009452377B2

(12) United States Patent
Wu et al.

(10) Patent No.: US 9,452,377 B2
(45) Date of Patent: Sep. 27, 2016

(54) NANOPOROUS CERAMIC MEMBRANE AND PREPARATION METHOD THEREOF

(71) Applicant: THE HKUST FOK YING TUNG RESEARCH INSTITUTE, Guangzhou (CN)

(72) Inventors: Jingshen Wu, Guangzhou (CN); Dong Lv, Guangzhou (CN); Zheming Zhang, Guangzhou (CN); Dan Li, Guangzhou (CN)

(73) Assignee: THE HKUST FOK YING TUNG RESEARCH INSTITUTE (CN)

( * ) Notice: Subject to any disclaimer, the term of this patent is extended or adjusted under 35 U.S.C. 154(b) by 363 days.

(21) Appl. No.: 14/079,662

(22) Filed: Nov. 14, 2013

(65) Prior Publication Data

US 2014/0131271 A1   May 15, 2014

(30) Foreign Application Priority Data

Nov. 15, 2012   (CN) .......................... 2012 1 0462221

(51) Int. Cl.
| | |
|---|---|
| *C04B 35/64* | (2006.01) |
| *B01D 39/20* | (2006.01) |
| *C04B 35/622* | (2006.01) |
| *C04B 38/00* | (2006.01) |
| *C04B 111/00* | (2006.01) |

(52) U.S. Cl.
CPC ..... *B01D 39/2068* (2013.01); *C04B 35/62245* (2013.01); *C04B 35/64* (2013.01); *C04B 38/00* (2013.01); *C04B 2111/00801* (2013.01); *C04B 2235/5228* (2013.01); *C04B 2235/5284* (2013.01)

(58) Field of Classification Search
CPC .. C04B 35/62245; C04B 35/64; C04B 38/00
See application file for complete search history.

(56) References Cited

U.S. PATENT DOCUMENTS

2011/0142790 A1* 6/2011 Chen .................... A61L 27/427
424/78.37
2014/0126135 A1* 5/2014 Abbatiello ............. B29C 70/68
361/679.31

OTHER PUBLICATIONS

Qi, Ruiling, et al. "Electrospun poly (lactic-co-glycolic acid)/halloysite nanotube composite nanofibers for drug encapsulation and sustained release." Journal of Materials Chemistry 20.47 (2010): 10622-10629.*

(Continued)

*Primary Examiner* — Angela Ortiz
*Assistant Examiner* — Russell Kemmerle, III
(74) *Attorney, Agent, or Firm* — Schmeiser, Olsen & Watts, LLP

(57) ABSTRACT

A nanoporous ceramic membrane and preparation method thereof is provided. The nanoporous ceramic membrane is prepared by halloysite nanotubes (HNTs), and its porosity is between 35% to 85%. This method comprises steps as following: HNTs and polymers with a certain ratio are dispersed in organic solvent, and HNTs/polymer composite fibers are prepared through electrospinning method; after the HNTs/polymers composite fibers are laminated, they are sintered at high temperature in a certain or vacuum atmosphere, and a nanoporous ceramic membrane is obtained. Ceramic membrane prepared by this method is corrosion resistant, thermal resistant, and have large specific surface area, it may widely applied in the field of filtration, catalyst carrier and purification of high-temperature gas, etc.

12 Claims, 5 Drawing Sheets

(56) References Cited

OTHER PUBLICATIONS

Figure 1:
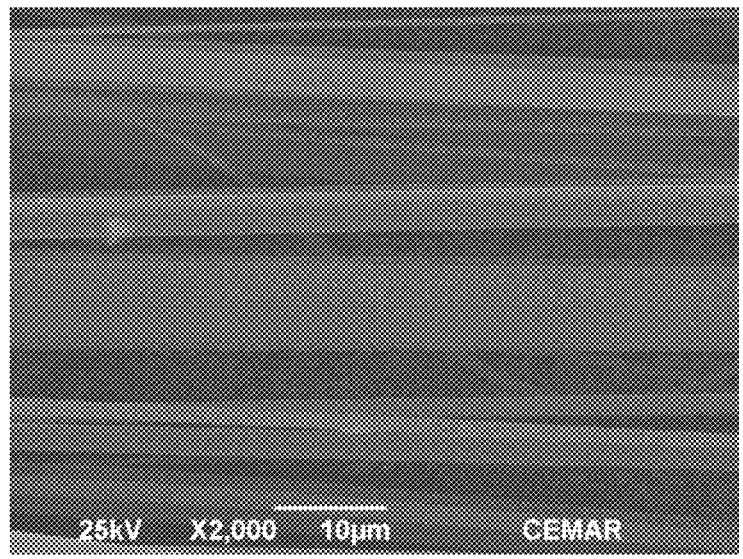
Figure 1:
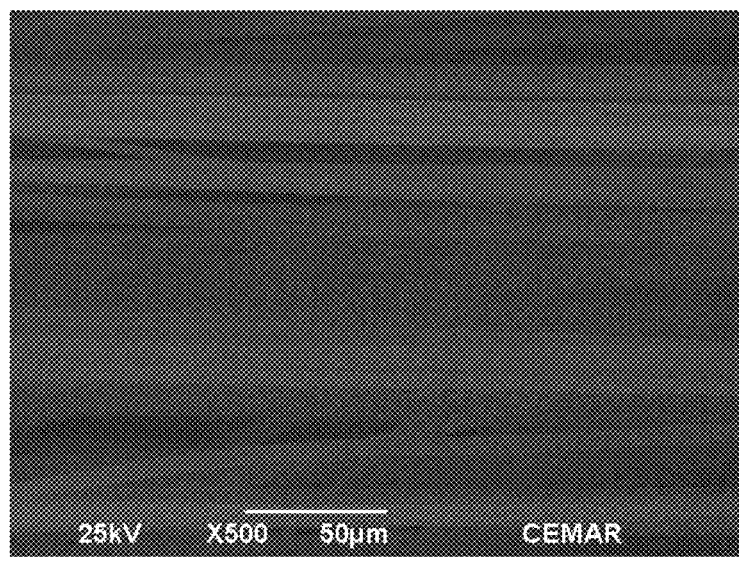

Shanks, R., and I. Mustapa. "All-Poly (lactic acid) Composites Prepared by Compression Moulding of Non-woven Precursors." Nineteenth International Conference on Processing and Fabrication of Advanced Materials (PFAM XIX). University of Auckland, 2011.*

Zhao, Yili, et al. "Hemocompatibility of electrospun halloysite nanotube- and carbon nanotube-doped composite poly (lactic-co-glycolic acid) nanofibers." Journal of Applied Polymer Science 127.6 (2013): 4825-4832.*

Lvov, Yuri M., et al. "Halloysite clay nanotubes for controlled release of protective agents." Acs Nano 2.5 (2008): 814-820.*

Qunyin Xu et al.: Synthesis of Porosity Controlled Ceramic Membranes; J. Mater. Res., vol. 6, No. 5, May 1991, pp. 1073-1081.

P. Hristov et al.: Preparation and Characterization of Porous Ceramic Membranes for Micro-Filtration From Natural Zeolite; Journal of the University of Chemical Technology and Metallurgy, 47, 4, 2012, pp. 476-480.

* cited by examiner

NANOPOROUS CERAMIC MEMBRANE AND PREPARATION METHOD THEREOF

TECHNICAL FIELD

The following relates to a porous membrane material and preparation method thereof, in particular a nanoporous ceramic membrane and preparation method thereof.

BACKGROUND

Inorganic membrane is a type of membrane manufactured by inorganic material. Although the inorganic membrane appeared later than organic membrane, it developed rapidly with bright prospect. Inorganic membrane was researched and applied in 1840s for the first time, and then the technology of ultrafiltration and microfiltration of inorganic membrane was established and developed from 1980s to 1990s. During the development, large amount of the inorganic membrane products were invented and applied in industry, and replaced some organic polymer membranes in the industry field of water treatment, dairy products and beverages, etc. In 1980s, a breakthrough was occurred in the preparation technology of inorganic membrane. Burggraf et al from Twente University prepared microporous ceramic membrane with multi-layers and asymmetric structure through Sol-Gel technology, and the diameter of pore could be less than 3 nm. This type of membrane was even capable of separating gas, thereby became a strong competitor of organic polymer membrane. The Sol-Gel technology brought the research of inorganic membrane, especially the ceramic membrane, into a new stage. In 1990s, the research and application of inorganic membrane were developed to the 3rd phase, that is, focusing on application of gas separation and, another one, using ceramic membrane as both separator and reactor, and primarily on the former one.

Ceramic membrane is a type of inorganic membrane most widely used recently. Comparing with organic membrane, the advantages of ceramic membrane are as following: 1) having good thermal stability, and suitable for high-temperature and high-pressure system, the operating temperature is up to 400° C., even up to 800° C. sometimes; 2) having good chemical stability, acid-resistant, alkalescence-resistant, and the wide range of pH adapted for use; 3) having good antimicrobial properties, and absence of reaction with common microorganism; 4) having high mechanical strength of inorganic membrane assembly; Inorganic membrane is usually used in the form of carrier membrane, and the carriers are microporous ceramic material and porous glass, etc., prepared through high pressure and roast, the carriers would be roasted at high temperature again after the membrane is coated, which makes the membrane very solid without easy drop and rupture; 5) the membrane itself is nontoxic, and it would not contaminate the separation system, the membrane is also easy to renew and clean; When the membrane is blocked, back flushing, washing or cleaning chemically at high temperature could be used; 6) the pore diameter of the ceramic membrane has a narrow distribution to achieve high separation accuracy.

Halloysite Nanotubes (HNTs) are a kind of silicate inorganic material with natural nanotube structure, having excellent thermal and mechanical properties, and have bright application prospect in the field of reinforced or toughened polymer material, carriers for orientation drug release, etc. Existing preparation technology of ceramic membrane could not readily control the porosity and pore diameter of ceramic membrane quantitatively. Therefore, a ceramic membrane formed by membrane material in the form of HNTs, prepared through electronspinning technology, is required.

SUMMARY

The first aspect of the present invention is to provide a nanoporous ceramic membrane, which is a new material and prepared by HNTs. The membrane is corrosion resistant, having lots of advantages such as huge specific surface area, high porosity, etc., and has bright prospect in field of filtration, catalyst carrier and purification of gas at high temperature, etc.

The second aspect of the present invention is to provide a preparation method of the nanoporous ceramic membrane. The preparation method prepared an inorganic porous ceramic membrane by HNTs. The preparation method is easy to operate, well controlled, and costs low.

According to the first aspect of the present invention, a nanoporous ceramic membrane, prepared by HNTs and having porosity between 35% to 85%, is provided. Further, the HNTs comprises modified HNTs (m-HNTs). The m-HNTs are prepared by the processes as following: HNTs are intensively mixed with anhydrous ethanol which is 5-15 times the weight of HNTs, then triethoxycaprylylsilane which is 10%-20% the weight of HNTs is added, and react at 80-120° C. for 1-6 hours.

According to the second aspect of the present invention, a preparation method of nanoporous ceramic membrane is provided, comprising the following steps:

Dispersing HNTs in organic solvents, adding polymers therein and intensively stirring so as to obtain spinning solution used for electronspinning; The weight ratio of organic solvent to polymer is between 4:1 to 9:1; The weight ratio of the HNTs to polymer is equal to or less than 1;

Preparing the spinning solution to form a polymer/HNTs membrane formed from composite fibers through electronspinning technic; and Sintering the membrane formed from composite fibers, removing polymers therein, so as to obtain the nanoporous ceramic membrane.

Further, the preparation method also comprises a process of laminating the membrane formed from composite fibers, to obtain ceramic membrane with specific dimension and density. In the process of laminating, a pressure of 0.2-5 MPa is used.

There are several advantages of preparing nanoporous ceramic membrane using electronspinning technics following: firstly, thickness and density of membrane formed from composite fibers, and microstructure of fibers before sintering process could be well controlled; secondly, by this method, the pore diameter and porosity of the sintered products could be controlled by changing the components of spinning solution and adjusting spinning process.

Moreover, the polymers may be one or two or more selected from plystyrene (PS), polyacrylonitrile (PAN), polyvinylpyrrolidone (PVP), polyl(actic-co-glycolic acid) (PLGA), polyving akohol (PVA), polyethylene oxide (PEO), polyamide (PA). The number average molar weight of the polymer is between $10^5$ to $1.5 \times 10^6$.

Further, the HNTs comprises m-HNTs. The HNTs are hydrophilic, and m-HNTs are hydrophobic due to grafting aliphatic chain on the surface of HNTs. Preferably, polymers are used as dispersion medium in the present invention, and some polymers are hydrophobic. Following similar dissolve mutually theory, the m-HNTs are dispersed well in hydrophobic polymers, thereby well dispersion of HNTs with high concentration in hydrophobic polymers could be ensured, leading to uniform pore diameter of the prepared inorganic membrane without obvious defects of microstructure.

Further, the m-HNTs are prepared by steps as following: HNTs are intensively mixed with anhydrous ethanol which is 5-15 times the weight of HNTs, then triethoxycaprylylsilane which is 10%-20% the weight of HNTs is added, and react at 80-120° C. for 1-6 hours.

Further, polymers used in the present invention may dissolved well in the organic solvent, and when PS is applied as the polymer, preferably, organic solvent of N, N-dimethyl formamide (DMF) and tetrahydrofuran (THF) with weight ratio of 3:1 is used.

Further, the electronspinning technic may achieve the technical effect of the present invention according to prior art. Preferably, the process of electrospinning in the present invention is as following: the prepared transparent solution is placed in a disposable syringe, the inner diameter of metal needle of the syringe is between 0.4 mm to 0.5 mm; the high voltage power supply is connected to the metal needle, and the rolling cylinder, the rolling speed of which is between 100-5000 rpm, is connected to the ground via an electronic conductive wire; the pumping speed is between 20 to 50 µl/min, the spinning voltage is between 5 to 30 KV, and the distance between the needle and collecting rolling cylinder is between 10 cm to 15 cm. Eventually, the polymer/HNTs composite fiber could be prepared, and be collected by rolling cylinder through its high rotation speed, then a membrane formed from highly aligned composite fibers is obtained. The thickness of the membrane could be controlled as required.

Further, the sintering process is as following: the furnace is heated to 300-500° C. with rate of 1-20° C./min, and the temperature is kept for 1-3 hours to allow sufficient combustion and decomposition of polymers; then the furnace is heated further to 1000-1400° C. with rate of 1-20° C./min and the temperature will be kept for 2-8 hours.

Further, the sintering process may be carried out in air, vacuum or inert gas atmosphere. The sintering could be controlled by controlling the sintering atmosphere of the entire system. The organics could be burned more sufficiently and completely if the system is in air atmosphere, and the HNTs membrane is obtained. In addition, vacuum pump may be used to vacuum the entire system, to ensure the sintering in the vacuum atmosphere. Alternatively high purity nitrogen or argon is inputted to ensure the sintering in inert gas atmosphere. Therefore, polymers would be cracked and carbonized at a certain temperature, and inorganics/carbon composite material would be obtained.

Some beneficial effects of the present application include:
1. A new nanoporous ceramic membrane could be obtained through preparation process of the present invention.
   1) HNTs are used to form the ceramic membrane, which has excellent mechanical properties, chemical stability, and thermal stability etc., and the weight loss of the ceramic membrane would be less than 2% after being immersed in 0.1 mol/l dilute sulphuric acid for 7 days (the weight of tested sample is less than 1 g), and the prepared inorganic membrane is effective at high temperature of 900° C. for a long time;
   2) The ceramic membrane is of porous structure with large specific surface area, and is excellent in properties of filtration and adsorption, the porosity measured by vacuum impregnation method could be between 35% to 85%;
   3) the content of carbon residue of the final product could be controlled by adjusting combustion atmosphere.

2. The preparation process of the present invention is easy to operate, well controlled, and costs low.

BRIEF DESCRIPTION

FIG. 1(a) and FIG. 1(b) are scanning electron microscope micrographs, showing the prepared PS/HNTs composite fibers according to Embodiment 1.

Figure 2:
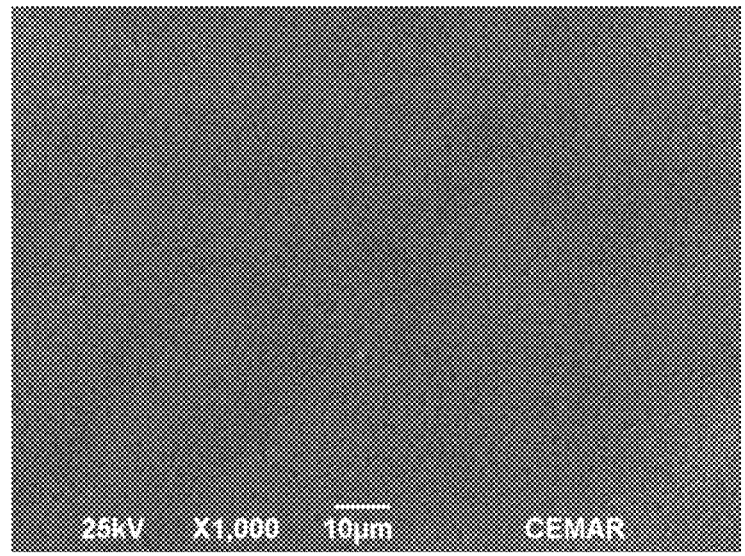
Figure 2:
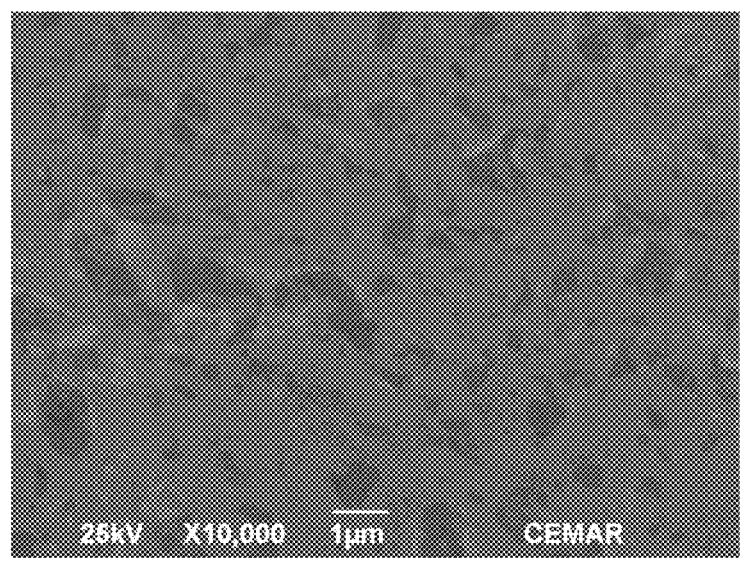

FIG. 2(a) and FIG. 2(b) are scanning electron microscope micrographs, showing the prepared ceramic membrane of Embodiment 2.

Figure 3:
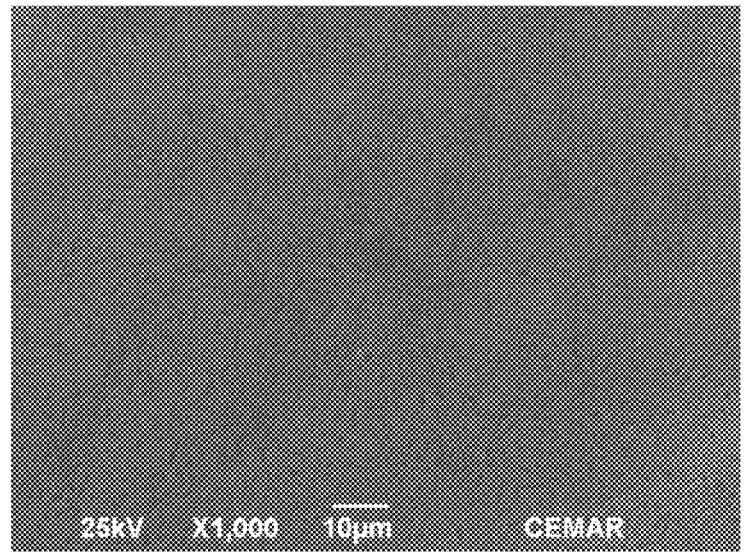
Figure 3:
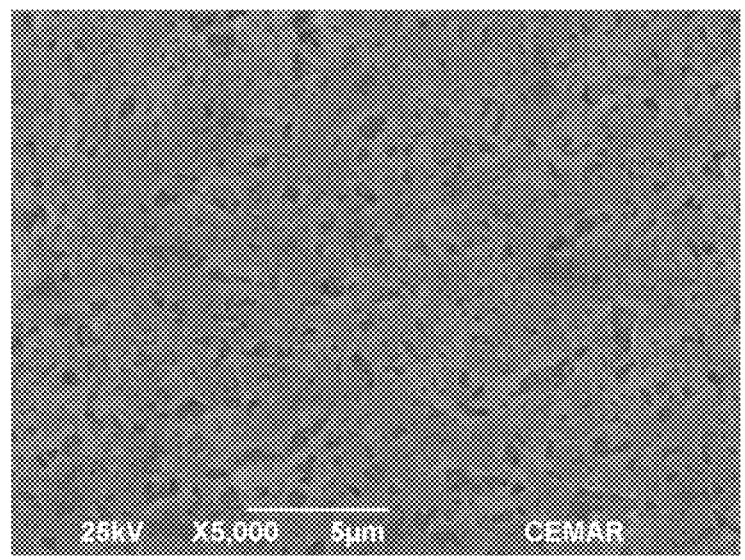

FIG. 3(a) and FIG. 3(b) are scanning electron microscope micrographs, showing the prepared ceramic membrane of Embodiment 3.

Figure 4:
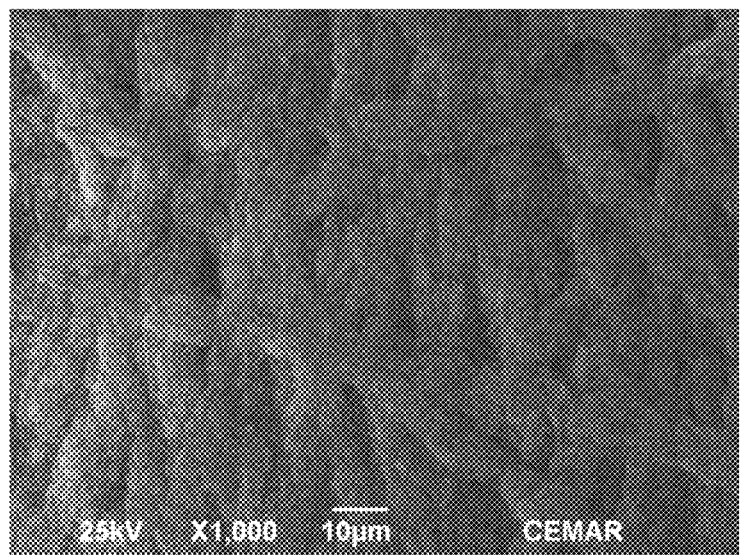
Figure 4:
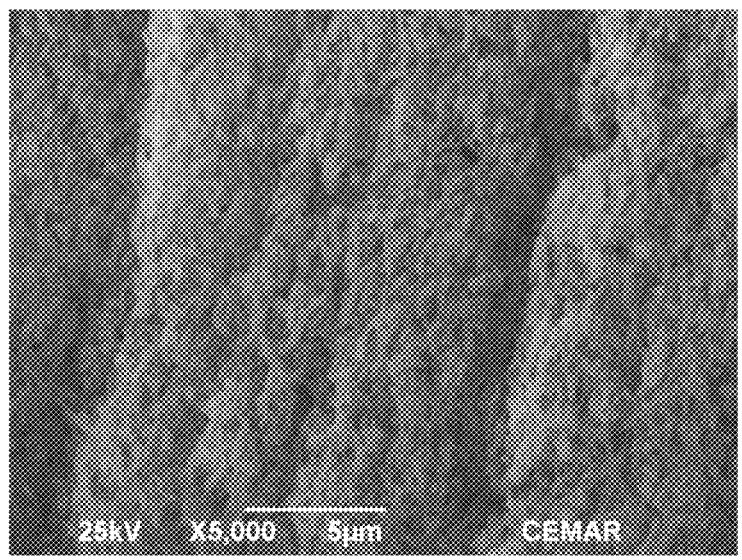

FIG. 4(a) and FIG. 4(b) are scanning electron microscope micrographs, showing the prepared ceramic membrane of Embodiment 4.

Figure 5:
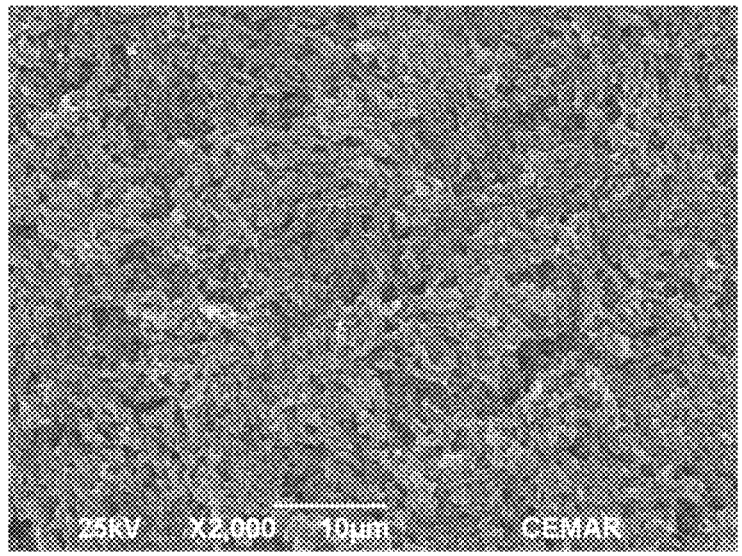
Figure 5:
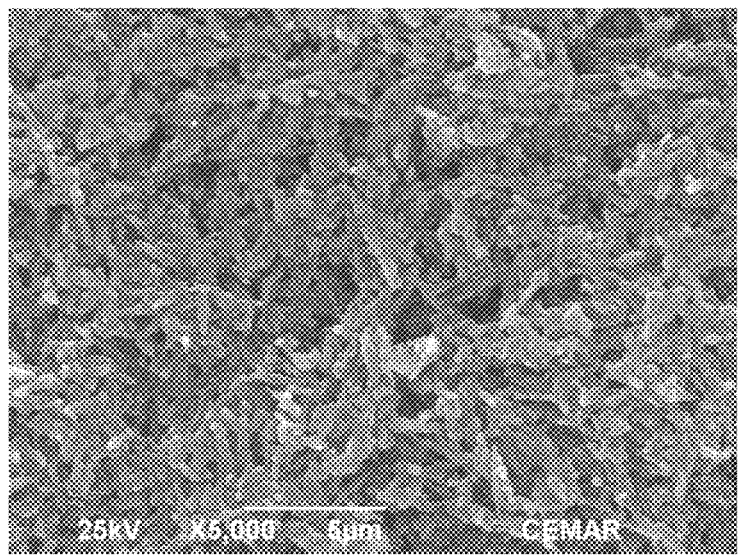

FIG. 5(a) and FIG. 5(b) are scanning electron microscope micrographs, showing the prepared ceramic membrane of Embodiment 5.

DETAILED DESCRIPTION

Embodiment 1

This embodiment illustrates the method to prepare polymer/HNTs composite fiber.

Dimethyl Formamide (DMF) and tetrahydrofuran (THF) are mixed into a mixture with weight ratio of 3:1.

A certain amount of HNTs are weighed and added into the mixture, ultrasonic treatment is employed to eliminate clusters. A certain amount of PS is added and the weight ratio of PS to the mentioned mixture is 1:4. At the meantime, the weight ratio of PS to HNTs is 4:1. After intensive mixing, a transparent and uniform solution for electronspinning is prepared.

The result solution is transferred into a syringe with an inner diameter of 0.5 mm for electrospinning. The voltage for electrospinning is 5 KV, pumping speed is 50 µl/min. The distance between needle and collecting rolling cylinder is 10 cm. The rolling speed of the rolling cylinder with diameter of 10 cm is 3000 rpm.

Produced composite fibers are observed under scanning electron microscope (SEM), see FIGS. 1(a) and 1(b). Based on the SEM micrographs, the fibers are highly aligned and their diameters are between 1 to 4 µm.

One skilled in the art should understand that the polymers which are employed to prepare the above electrospinning solution may be one or two or more selected from polystyrene, polyacrylonitrile, polyvinylpyrrolidone, poly(lactic-co-glycolic acid), poly(vinyl alcohol), poly(ethylene oxide), Polyamide. Theoretically, any polymer could be applied, if only it is capable of dissolving in the organic solvent to obtain electronspinning solution.

One skilled in the art should understand that proper organic solvent can be chosen according to selected polymer in this invention to have good compatibility with the polymer. Theoretically, any organic solvent could be applied, if only it is capable of dissolving with chosen polymer to obtain electronspinning solution. When the polymer is selected as PS, the organic solvent is preferred, but not limited to the mixture of DMF and THF with weight ratio of 3:1.

Embodiment 2

The prepared composite fiber in Embodiment 1 is collected to obtain a membrane formed from highly aligned composite fibers. A ceramic tablet press (ZP21U) is applied to press the membrane under 0.5 MPa pressure, then the product is transferred into a tube furnace (OTF-1200X vacuum hot-pressing furnace) for high temperature sintering. In low temperature, the heating rate is 5° C./min and the residual water of the product can be completely and slowly evaporated. At PS's burning temperature of 360° C., the temperature is kept for 3 hours to provide enough time for the burning of PS. After that, the furnace is slowly heated to 1000° C. with heating rate of 5° C./min and then the temperature will be kept for 2 hours. The sintering is carried out in air atmosphere. The products are observed by SEM, see FIGS. 2 (a) and (b).

Embodiment 3

The prepared composite fiber in Embodiment 1 is collected to obtain a membrane formed from highly aligned composite fibers, and it is pressed under 5 MPa pressure. Then the product is transferred into a tube furnace for high temperature sintering. In low temperature, the heating rate is 5° C./min and the residual water of the product can be completely and slowly evaporated. At PS's burning temperature of 360° C., the temperature is held for 3 hours to provide enough time for the burning of PS. After that, the furnace is heated to 1000° C. with the heating rate of 20° C./min and the temperature will be kept for 6 hours. The sintering is carried out in air atmosphere. The products are observed by SEM, see FIGS. 3 (a) and (b).

Embodiment 4

The prepared composite fiber in Embodiment 1 is collected to obtain a membrane formed from highly aligned composite fibers, and it is pressed under 0.5 MPa pressure. Then the product is transferred into a tube furnace for high temperature sintering. In low temperature, the heating rate is 5° C./min and the residual water of the product can be completely and slowly evaporated. At PS's burning temperature of 360° C., the temperature is held for 3 hours to provide enough time for the decomposition of PS. After that, the furnace is heated to 900° C. with heating rate of 15° C./min and the temperature will be kept for 3 hours. The sintering atmosphere is carried out in vacuum atmosphere. The products are observed by SEM, see FIGS. 4 (a) and (b). The products are also characterized by Energy dispersive X-ray spectrometry (EDS). Table 1 shows the elements in the product. Based on this table, the residual materials after sintering are HNTs and carbon.

TABLE 1

| element | atom % |
|---------|--------|
| C K     | 46.98  |
| O K     | 31.66  |
| Al K    | 10.22  |
| Si K    | 11.14  |
| total   | 100%   |

Embodiment 5

The prepared composite fiber in Embodiment 1 is collected to obtain a membrane formed from highly aligned composite fibers, and it is pressed under 0.2 MPa pressure. Then the product is transferred into a tube furnace for high temperature sintering. In low temperature, the heating rate is 5° C./min and the residual water of the product can be completely and slowly evaporated. The temperature at 500° C. is held for 3 hours to provide enough time for the decomposition of PS. After that, the furnace is slowly heated to 900° C. with heating rate of 5° C./min and the temperature will be kept for 8 hours. The sintering is carried out in vacuum atmosphere. The products are observed by SEM, see FIGS. 5 (a) and (b).

Embodiment 6

A certain amount of HNTs are weighed and added into DMF, ultrasonic treatment is employed to eliminate clusters. A certain amount of PVP is added and the weight ratio of PVP to DMF is 1:9. At the meantime, the weight ratio of PVP to HNTs is 4:1. After intensive mixing, a transparent and uniform solution for electronspinning is prepared.

The result transparent solution is transferred into a syringe for electrospinning, the inner diameter of the needle of the syringe is 0.4 mm. The voltage for electronspinning is 30 KV, pumping speed of solution is 50 μl/min. The distance between needle and collecting rolling cylinder is 10 cm. The rolling speed of the rolling cylinder with diameter of 10 cm is 3000 rpm.

The composite fiber with the diameter between 0.5 to 5 μm is collected to form a membrane formed from highly aligned composite fibers.

The composite fibers membrane is pressed under 5 MPa pressure, and the product is sintered in the tube furnace at high temperature. In low temperature, the heating rate is 15° C./min and the residual water of the product can be slowly and completely evaporated. At PVP's burning temperature of 350° C., the temperature is held for 3 hours to provide enough time for the decomposition of PVP. After that, the furnace is slowly heated to 1050° C. with heating rate of 5° C./min and the temperature will be kept for 2 hours. The sintering is carried out in $N_2$ gas atmosphere.

Embodiment 7

HNTs and anhydrous ethanol are mixed with weight ratio of 1:10.

Triethoxycaprylylsilane (TEOS) is added into the result mixture, the weight ratio of TEOS to HNTs is 1:10. After intensive mixing, the TEOS and HNTs react at 80° C. for 6 hours to obtain modified HNTs (m-HNTs).

Dimethyl Formamide (DMF) and tetrahydrofuran (THF) are mixed into a mixture with weight ratio of 3:1.

A certain amount of m-HNTs are weighed and added into the mixture, ultrasonic treatment is employed to eliminate clusters. A certain amount of PS is added and the weight ratio of PS to the mixture is 1:9. At the meantime, the weight ratio of PS to m-HNTs is 4:1. After intensive mixing, a transparent and uniform solution for electronspinning is prepared.

The result solution is transferred into a syringe for electrospinning, the inner diameter of the needle of the syringe is 0.4 mm. The voltage for electronspinning is 30 KV, pumping speed of solution is 20 l/min. The distance between needle and collecting rolling cylinder is 15 cm. The rolling speed of the rolling cylinder with diameter of 10 cm is 3000 rpm.

The composite fiber with the diameter between 0.5 to 2 μm is collected to form a membrane formed from highly aligned composite fibers.

The membrane formed from composite fibers is pressed under 0.2 MPa pressure, and the product is sintered in the tube furnace at high temperature. In low temperature, the heating rate is 1° C./min and the residual water of the product can be slowly and completely evaporated. At PS's burning temperature of 300° C., the temperature is held for 1 hour to provide enough time for the decomposition of PS. After that, the furnace is heated to 850° C. with heating rate of 5° C./min and the temperature will be kept for 8 hours. The sintering is carried out in He gas atmosphere.

Embodiment 8

The nanoporous ceramic membrane prepared in Embodiments 2-7 are immersed in 0.1 mol/l dilute sulphuric acid for 7 days. The weight of the testing samples is no more than 1 g. The weight loss of the testing samples is between 0.8% to 2%, see table 2.

TABLE 2

| Testing samples | Weight loss |
| --- | --- |
| Embodiment 2 | 0.8% |
| Embodiment 3 | 1.3% |
| Embodiment 4 | 2% |
| Embodiment 5 | 1.5% |
| Embodiment 6 | 1.6% |
| Embodiment 7 | 1.8% |

Embodiment 9

The nanoporous ceramic membranes prepared in Embodiments 2-7 are tested by a vacuum impregnation method, wherein the liquid is deionized water. Their tested porosities are between 35% to 85%, see table 3.

TABLE 2

| Testing samples | Porosity |
| --- | --- |
| Embodiment 2 | 60% |
| Embodiment 3 | 35% |
| Embodiment 4 | 65% |
| Embodiment 5 | 73% |
| Embodiment 6 | 52% |
| Embodiment 7 | 85% |

Apparently, the embodiments described hereinbefore are merely preferred embodiments for describing the present invention more clearly and not for purposes of any restrictions or limitations on the invention. Therefore, various alterations or improvement by the one skilled in the art could be made on the basis of above description. All embodiments could not be exhaustively described herein. Any non-substantive, obvious alterations and variations without departing from technical solution of the present invention may be incorporated into ambit of the present invention.

What is claimed is:

1. A preparation method of a ceramic membrane, wherein said preparation method comprises:
    dispersing halloysite nanotubes in organic solvents, wherein polymers are added therein and stirred until a uniform solution is prepared, whereby a spinning solution used for electrospinning is obtained;
    wherein a weight ratio of said organic solvent to said polymers is between 4:1-9:1; a weight ratio of the halloysite nanotubes to polymer is equal to or less than 1;
    wherein an electrospining method is applied to obtain composite fibers by using said spinning solution, whereby a polymer and halloysite nanotubes membrane is prepared;
    wherein said membrane formed from composite fibers is sintered to remove polymers to obtain the nanoporous ceramic membrane.

2. The preparation method of claim 1, wherein said preparation method comprises a process of laminating said membrane formed from composite fibers.

3. The preparation method of claim 2, wherein a pressure of 0.2-5 MPa is used in said process of laminating said membrane formed from composite fibers.

4. The preparation method of claim 1, wherein said polymer comprises one or two or more selected from polystyrene, polyacrylonitrile, polyvinylpyrrolidone, poly(lactic-co-glycolic acid), polyvinyl alcohol, polyethylene oxide, or polyamide.

5. The preparation method of claim 4, wherein a number average molar weight of said polymer is between $10^5$ to $1.5 \times 10^6$.

6. The preparation method of claim 1, wherein said halloysite nanotubes comprise modified halloysite nanotubes.

7. The preparation method of claim 6, wherein said modified halloysite nanotubes are prepared by the steps as following:
    mixing the halloysite nanotubes with anhydrous ethanol which is 5-15 times the weight of the halloysite nanotubes until a uniform solution is prepared, then triethoxycaprylylsilane which is 10%-20% the weight of the halloysite nanotubes is added, and reacted at 80-120° C. for 1-6 hours.

8. The preparation method of claim 1, wherein said polymer is polystyrene, said organic solvent comprises a mixture solvent of N, N-Dimethyl Formamide (DMF) and tetrahydrofuran (THF) with a weight ratio of 3:1.

9. The preparation method of claim 1, wherein said electrospinning method is performed in conditions as following: an inner diameter of a metal needle of a syringe is between 0.4 to 0.5 mm, a pumping speed for the solution is between 20 to 50 μl/min, a voltage for spinning is between 5 to 30 KV, and a distance between the metal needle and a collecting rolling cylinder is between 10 cm to 15 cm.

10. The preparation method of claim 1, wherein said membrane formed from composite fibers is sintered in conditions as following:
    a furnace is heated to 300-500° C. with heating rate of 5-20° C./min and a temperature will be kept for 1-3 hours; and
    the furnace is heated further to 850-1050° C. with a heating rate of 5-20° C./min and the temperature will be kept for 2-8 hours.

11. The preparation method of claim 1, wherein said membrane formed from composite fibers is sintered in air, vacuum or inert gas atmosphere.

12. The preparation method of claim 10, wherein said membrane formed from composite fibers is sintered in air, vacuum or inert gas atmosphere.

* * * * *

UNITED STATES PATENT AND TRADEMARK OFFICE
CERTIFICATE OF CORRECTION

PATENT NO. : 9,452,377 B2
APPLICATION NO. : 14/079662
DATED : September 27, 2016
INVENTOR(S) : Jingshen Wu et al.

Page 1 of 1

It is certified that error appears in the above-identified patent and that said Letters Patent is hereby corrected as shown below:

On the Title Page

Abstract
Line 12, please change
"have" to --has a--

Line 13, please change
"may" to --may be--

In the Specification

Column 3, Line 28, please change
"rolling" to --the rolling--

In the Claims

Column 8, Line 5 (Claim 1, Line 11), please change
"electrospining" to --electrospinning--

Signed and Sealed this
Eleventh Day of April, 2017

Michelle K. Lee
*Director of the United States Patent and Trademark Office*